United States Patent [19]

Okano et al.

[11] Patent Number: 4,644,784
[45] Date of Patent: Feb. 24, 1987

[54] SUCTION PIPE PRESSURE DETECTION APPARATUS

[75] Inventors: Hiroshi Okano; Yukio Kawai; Akira Ii, all of Toyota, Japan

[73] Assignee: Toyota Jidosha Kabushiki Kaisha, Aichi, Japan

[21] Appl. No.: 802,459

[22] Filed: Nov. 27, 1985

[30] Foreign Application Priority Data

Nov. 29, 1984 [JP] Japan .............................. 59-252758
Dec. 28, 1984 [JP] Japan .............................. 59-275529
Dec. 28, 1984 [JP] Japan .............................. 59-275530
Dec. 28, 1984 [JP] Japan .............................. 59-275531

[51] Int. Cl.$^4$ .......................................... F02M 51/00
[52] U.S. Cl. ................................. 73/117.3; 123/480
[58] Field of Search ............... 73/117.3; 123/463, 478, 123/480, 486

[56] References Cited

U.S. PATENT DOCUMENTS

| | | | |
|---|---|---|---|
| 3,908,609 | 9/1975 | Iwata et al. .......................... | 123/478 |
| 4,181,944 | 1/1980 | Yamauchi et al. ................... | 123/480 |
| 4,377,145 | 3/1983 | Nagaishi ............................. | 123/463 |
| 4,465,051 | 8/1984 | Hasegawa .......................... | 123/478 |
| 4,469,074 | 9/1984 | Takao et al. ........................ | 123/480 |
| 4,471,742 | 9/1984 | Kishi .................................. | 123/480 |
| 4,495,926 | 1/1985 | Kobayashi et al. ................. | 123/486 |

OTHER PUBLICATIONS

EFI Manual, Toyota Motor Corp., May 1980 Publ., Jun. 1984 9th edition, including English translation, pp. 1-14.
Toyota Corolla/Corolla Levin, New Car Features, May 1983, English transl., 1-10.
Celica New Car Features, Aug. 1985, Toyota, TD-2-1-TD-37.

Primary Examiner—Jerry W. Myracle
Assistant Examiner—Robert R. Raevis
Attorney, Agent, or Firm—Parkhurst & Oliff

[57] ABSTRACT

Disclosed is a suction pipe pressure detection apparatus for detecting suction pipe pressure of a multi-cylinder type internal combustion engine provided with a throttle valve in the suction pipe of each of the cylinders, or a so-called independent suction type internal combustion engine. The apparatus detects the suction pipe pressure for just a few cylinders out of the total number of cylinders, makes proper corrections to the detected data in accordance with the throttle valve opening, engine speed of the internal combustion engine, etc., and, during the period before the next detection of the suction pipe pressure is made, accurately computes, using the above data, the suction pipe pressure for the cylinders, under the suction stroke, for which the pressure is not actually detected. That is, the throttle opening and the engine speed of the internal combustion engine are detected at intervals of shorter periods of time than those intervals at which the suction pipe pressure is actually detected, and correction is continuously made to the earlier detected suction pipe pressure according to the above detected data. The present invention enables a high-degree controlling of the internal combustion engine by making highly accurate suction pipe pressure data available at rather high frequency, and by further continually providing the intake air quantity, and the fuel injection amount, with considerable high accuracy.

7 Claims, 37 Drawing Figures

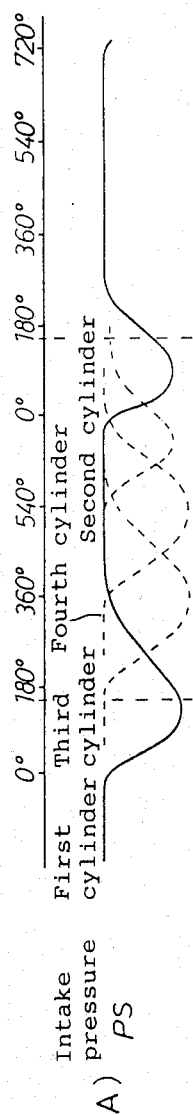
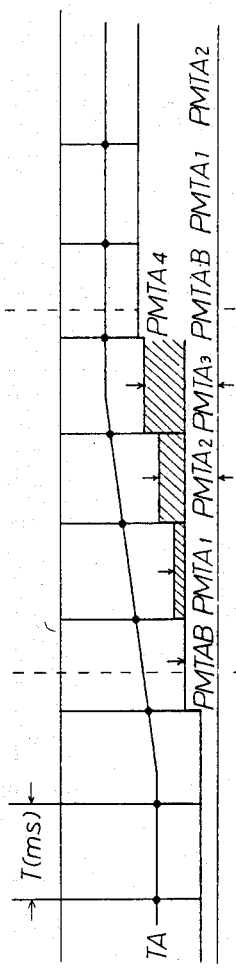

Fig.10 (A) Intake pressure PS
Fig.10 (B) PSAD1
Fig.10 (C) PSAD2
Fig.10 (D) QPMC
Fig.10 (E) QTAC
Fig.10 (F) Q
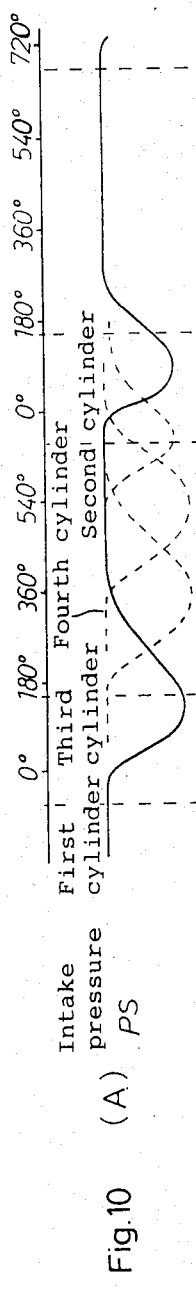
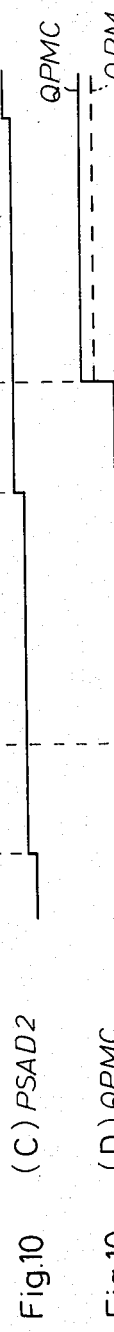
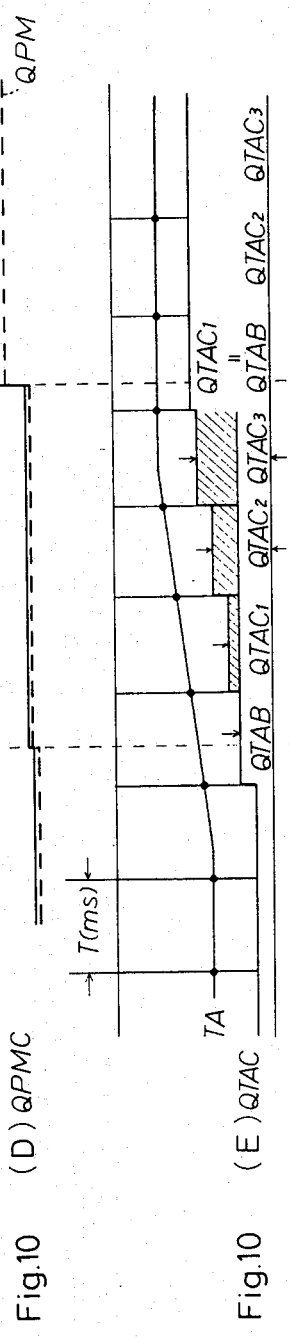
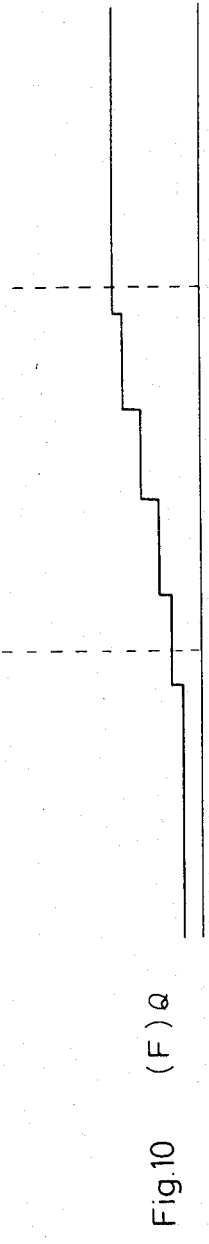

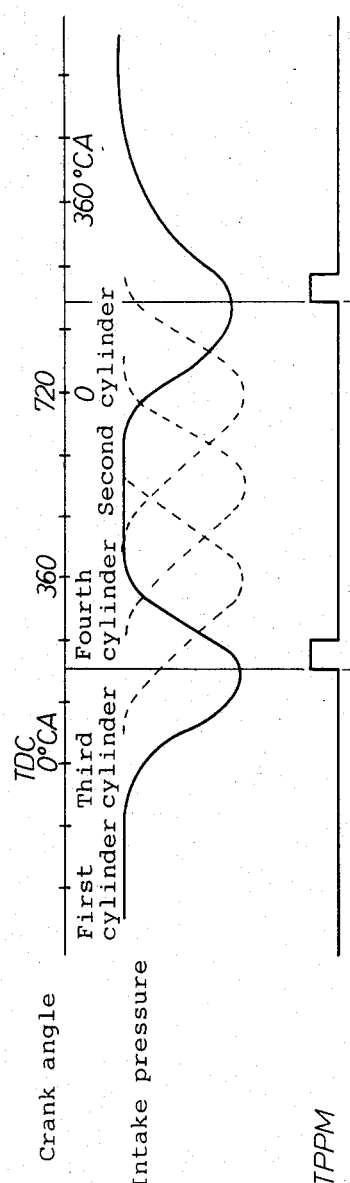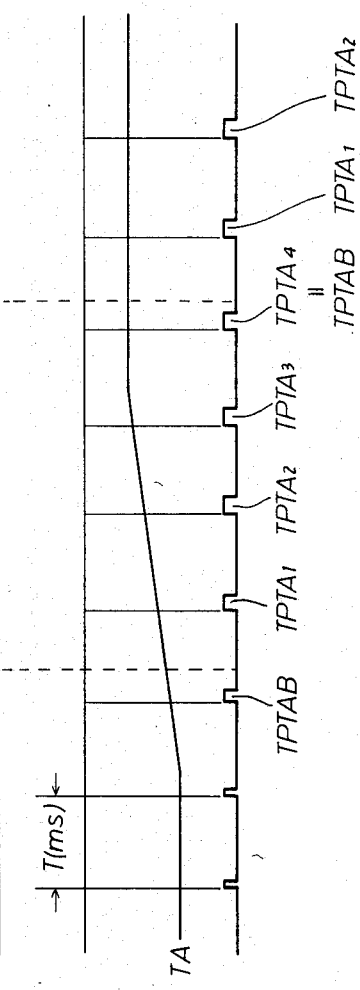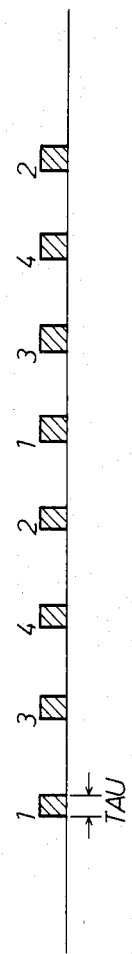
Fig.13 (A) Intake pressure
Fig.13 (B) TPPM
Fig.13 (C) TPTA
Fig.13 (D) TAU

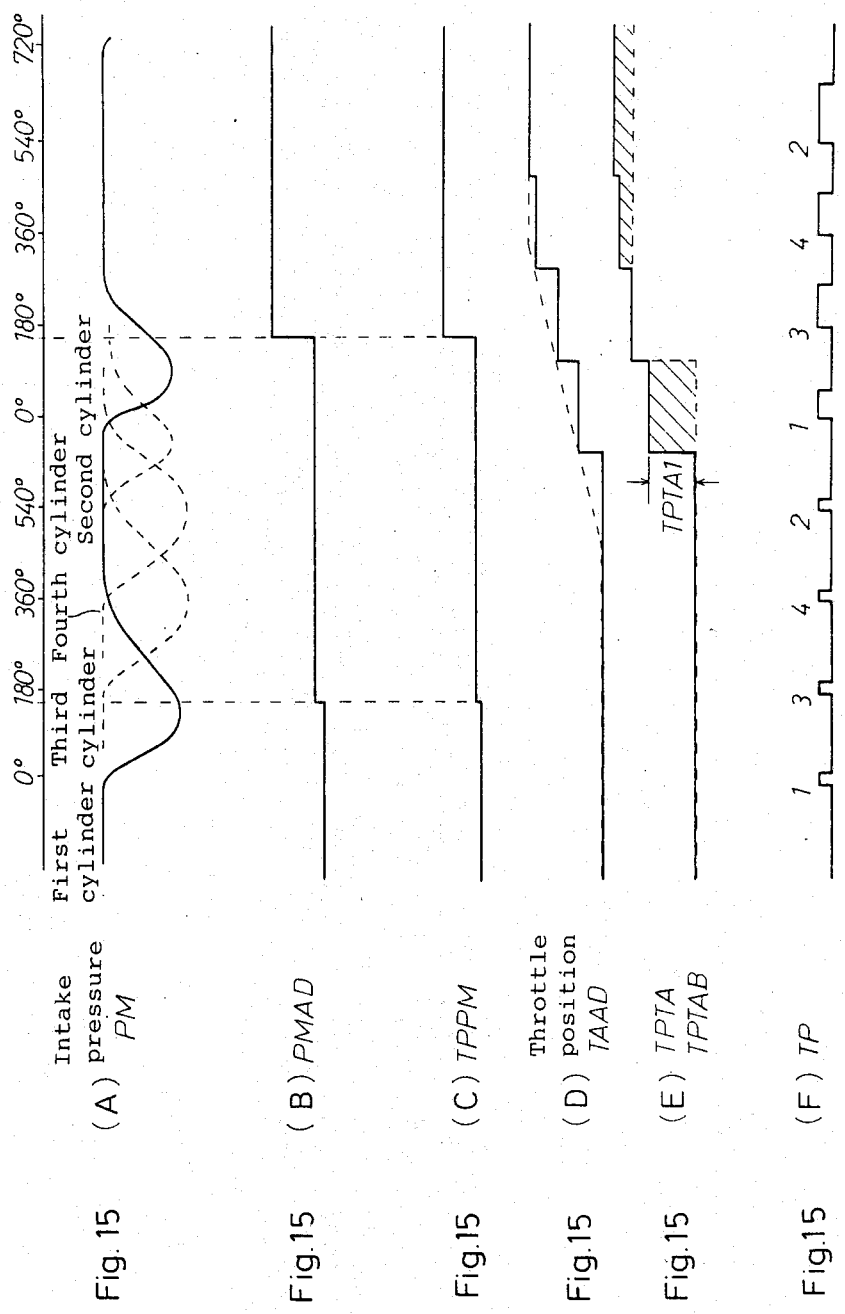

SUCTION PIPE PRESSURE DETECTION APPARATUS

BACKGROUND OF THE INVENTION

1. Field of the Invention

The present invention relates to a suction pipe pressure detection apparatus for detecting suction pipe pressure in an internal combustion engine. More particularly, the present invention relates to a suction pipe pressure detection apparatus for detecting suction pipe pressure in an internal combustion engine which is provided with a throttle valve for each cylinder, i.e., in a so-called independent suction type internal combustion engine.

2. Description of the Prior Art

While internal combustion engines have so far been put in operation with an optimum amount of fuel supplied and under the condition of a desired air-fuel ratio, and the combustion timing therefor has been controlled to be at optimum timing for ignition, the air intake amount for multi-cylinder engines has normally been calculated based upon the suction pipe pressure measured by a pressure sensor as an average value for all of the cylinders or detected by an airflow meter.

Recently, however, in order to enhance the operating performance of the internal combustion engine and to improve response characteristics of the engine such as acceleration response, the art of the internal combustion engine has included a throttle valve for each cylinder thereof, to construct, a so-called independent cylinder type internal combustion engine. Control techniques for such an internal combustion engine are being studied and developed.

Since the independent suction type internal combustion engine has been provided with a throttle valve for each cylinder, not only have good responses been brought about but also effective operation of the internal combustion engine has been made possible because of elimination of pressure interference among cylinders. On the other hand, however, there has been the need for providing an airflow meter, pressure sensor, or the like for each cylinder for detection of the intake air amount therefor and this has made the engine structure rather complex.

As the apparatus for detecting the intake air amount for controlling independent cylinder type internal combustion engines, the most commonly used type has been a simple structure using an airflow meter. That is, an airflow meter is fitted on the upstream side of the throttle valves where a number of suction pipes meet. For detecting the suction pipe pressure there has been proposed a system having a newly provided communicating vessel connected with each suction pipe which allows an averaged pressure to be detected.

The above described techniques, however, have some disadvantages as follows and are not yet satisfactory.

While the greatest merit of the independent cylinder type internal combustion engine is the excellence of response, the provision of the airflow meter in the portion where the suction pipes meet means that the airflow meter produces resistance to the intake air and consequently impairs the above merit.

Therefore, detection of the suction pipe pressure with accuracy becomes the most desirable technique in exercising control of the independent cylinder type internal combustion engine. But the prior art for detecting the intake air pressure through the provision of the communicating vessel connected with all the cylinders produces a new problem of pressure interference among the cylinders through the communicating vessel, and, further, it makes the structure rather complex and also costly.

SUMMARY OF THE INVENTION

The present invention has been made to solve the above described problems. Accordingly, a primary object of the invention is the provision of an excellent suction pipe pressure detection apparatus for the independent cylinder type internal combustion engine, the apparatus being capable of accurate detection of the suction pipe pressure in the internal combustion engine with a simple structure while maintaining the advantages of the independent cylinder arrangement.

Another object of the invention is the provision of accurate suction pressure signals for various control units controlling the internal combustion engine and thereby maximizing the operation of the internal combustion engine.

A further object of the invention is the provision of an accurate suction pipe pressure signal to form the foundation for the detection of the air intake amount, which is one of the most important data in controlling the internal combustion engine.

Still another object of the invention is the provision of an accurate suction pipe pressure signal for the electronic fuel injection apparatus as the basis for its deciding the fuel injection time.

A still further object of the invention is the provision of means which enables, by detecting the suction pipe pressure for just one cylinder in the least case in the independent cylinder type internal combustion engine, the values of the suction pipe pressure for other cylinders to be known during the period of time from the above detection to the next detection of the suction pipe pressure of that cylinder.

In order to achieve these objects, the suction pipe pressure detection apparatus of the invention for detecting the suction pipe pressure of the internal combustin engine having a throttle valve in the suction pipe for each cylinder includes the following:

(A) suction pipe pressure detection means for detecting the suction pipe pressure on the downstream side of the throttle valves for a few of the cylinders of the total number of the cylinders of the internal combustion engine in synchronism with the crank angle of the internal combustion engine for generating a suction pipe pressure signal;

(B) throttle-opening detection means for detecting the throttle valve opening at higher frequency than that at which the above suction pipe pressre detection means detects the suction pipe pressure, and for generating a throttle-opening signal; and (C) correction means for correcting the suction pipe pressure signal according to the throttle-opening signal.

The apparatus of the present invention is provided with engine speed detection means for detecting the engine speed of the internal combustion engine for generating an engine speed signal. Further, the inventive apparatus produces a good effect through the correction made by the correction means to the suction pipe pressure signal in accordance with the throttle-opening signals and the engine speed signal.

The apparatus of the invention is provided with, in addition to the engine speed detection means, intake air amount computing means for generating an air intake quantity signal corresponding to the suction pipe pressure signal and the engine speed signal, and the air intake quantity signal is corrected according to the throttle-opening signal by the correction means, which also produces a good effect.

The following arrangements are also included in the present invention:

an arrangement allowing the intake air quantity computing means to generate (a) a reference intake air quantity signal responding to the suction pipe pressure signal at the time when the suction pipe is at suction and the engine speed signal; and (b) an intake air quantity correcting value signal responding to the throttle opening signal and the engine speed signal, thereby allowing the correction means to correct the reference intake air quantity signal and the intake air quantity correction value signal according to the suction pipe pressure at the time when the suction pipe is not at suction, and allowing the air intake quantity computing means to generate an intake air quantity signal for the internal combustion engine responding to the compensated reference intake air quantity signal and the compensted intake air quantity correction value signal;

an arrangement allowing reference fuel injection amount computing means to generate a reference fuel injection amount signal responding to the suction pipe pressure signal and the engine speed signal and allowing the correction means to correct the reference fuel injection amount signal according to the throttle-opening signal; and an arrangement allowing suction pipe pressure detection means to detect the suction pipe pressure of one suction pipe out of all the suction pipes and allowing the throttle-opening detection means to detect the throttle opening at intervals of predetermined periods.

The suction pipe pressure detection means of the invention is means for detecting pressure in a suction pipe for a cylinder in synchronism with a crank angle in an internal combustion engine. For the above detection to be in synchronism with a crank angle implies that the detection of the suction pipe pressure is to be carried out while the relevant cylinder is correctly at the suction stroke. Therefore, the above means can be provided by using a conventional suction pressure sensor and adapting the output of the sensor to be sensed at the predetermined crank angle.

The engine speed detection means is means for detecting the engine speed of the internal combustion engine. The means can be simply provided by using a crank angle detection means conventionally used with the internal combustion engines and adapting the number of outputs thereof at a unit time to be counted. And, the predetermined crank angle for the suction pipe pressure detection means can simply be detected by using the engine speed detection means and a cylinder distinction sensor conventionally used with the internal combustion engines.

The throttle-opening detection means is means for detecting opening of a throttle valve provided for a suction pipe for each cylinder. While the opening of each throttle valve must be detected if all the throttle valves are independently controlled and therefore all the openings are independent from one another detecting the opening of only one of the throttle valves is sufficient if all the throttle valves operate in conjunction. The detection in this case is carried out more frequently than the detection made by the suction pipe pressure detection means. As stated above, the suction pipe pressure detection means performs the detection at each suction stroke of a cylinder, namely, the detection is made at intervals of 720° crank angle (CA) in the internal combustion engine for a specific cylinder. Therefore, in the case where the suction pipe pressure detection means are attached to N sets of cylinders, the throttle-opening detection means can be provided by an arrangement able to detect the opening in synchronism with the crank angle smaller than 720° CA/N, for example, or at intervals of periods shorter than the time period required for the rotation through the crank angle of 720° CA/N.

The correction means is such that it corrects the suction pipe pressure at a suction stage detected by the suction pipe pressure detection means, according to the throttle opening detected by the throttle opening detection means at higher frequency, and, if necessary, the engine speed, and provides a value corresponding to a suction pipe pressure. As stated in the foregoing, the suction pipe pressure detection means takes the data only in synchronism with the suction stroke once for every 720° CA. Thus, when it becomes necessary to get the suction pipe pressure at any time, the value corresponding to the suction pipe pressure is provided through correction of the actually measured suction pipe pressure according to the throttle opening.

The air intake amount computing means is means for computing the atmospheric pressure-compensated intake air amount for the internal combustion engine from results detected by the suction pipe pressure detection means, the number of revolution detection means, and the throttle opening detection means. Therefore, as the arrangement for constituting the computing means is considered such as a non-programmable-type computing circuit to which the detected results from the above three means are input, a programmable-type computing apparatus with a microcomputer and therein in place of the above mentioned non-programmable-type computing circuit, and a design enabled, in order to increase the operation speed, to retrieve necessary data from a table provided in advance.

The reference fuel injection amount computing means computes the amount of fuel to be supplied by injection to the internal combustion engine from detected results by the engine speed detection means and the suction pipe pressure detection means. This will be formed with an arithmetic and logic circuit using a microcomputer conventionally mounted on the internal combustion engine or with a discrete arithmetic circuit. The computation may be obtained through actual operations or retrieval of data from a previously provided table.

By the above described arrangements and operations, the suction pipe pressure detection apparatus of the invention detects the suction pipe pressure of a specific cylinder detected by the suction pipe pressure detection means in synchronism with the crank angle and constantly provides the suction pipe pressure of the internal combustion engine, i.e., the above detected suction pipe pressure as basic data corrected properly by the correction means according to the value detected by the throttle opening detection means.

BRIEF DESCRIPTION OF THE DRAWINGS

FIGS. 5(A)–5(E) are timing charts for the first embodiment;

FIGS. 10(A)–10(F) are timing charts for the second embodiment;

FIGS. 12 and 13(A)–13(D) are a flow chart and timing charts, respectively, for the third embodiment; and FIGS. 14(A), 14(B) and FIGS. 15(A)–15(F) are flow charts and timing charts, respectively, for the fourth embodiment.

DESCRIPTION OF THE PREFERRED EMBODIMENTS

For a more concrete understanding of the invention, a detailed description of the preferred embodiments will be given.

Figure 1:
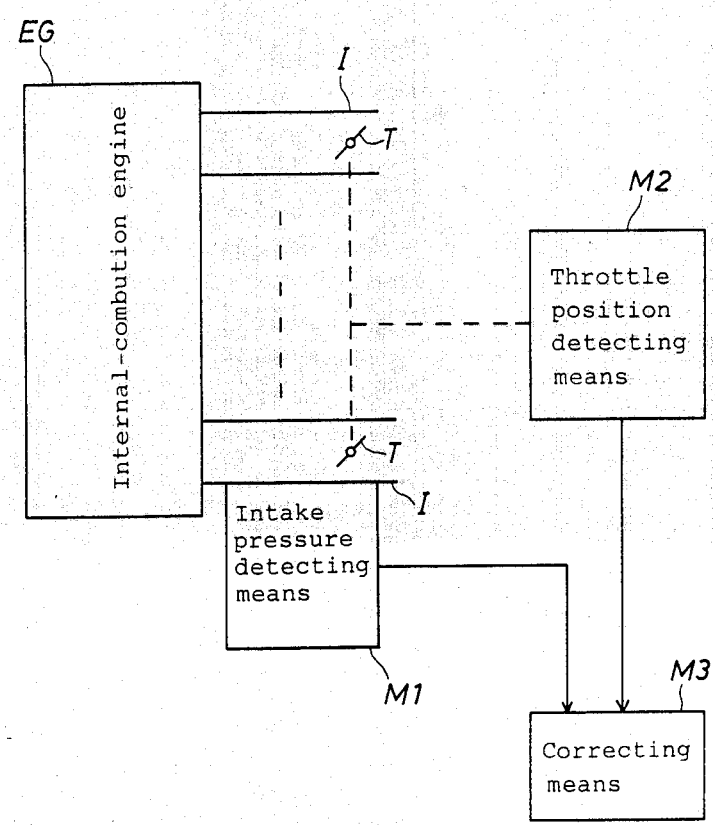
FIGS. 1(A) and 1(B) are basic block diagrams of various means arranged in a first embodiment of the invention.
Figure 1:
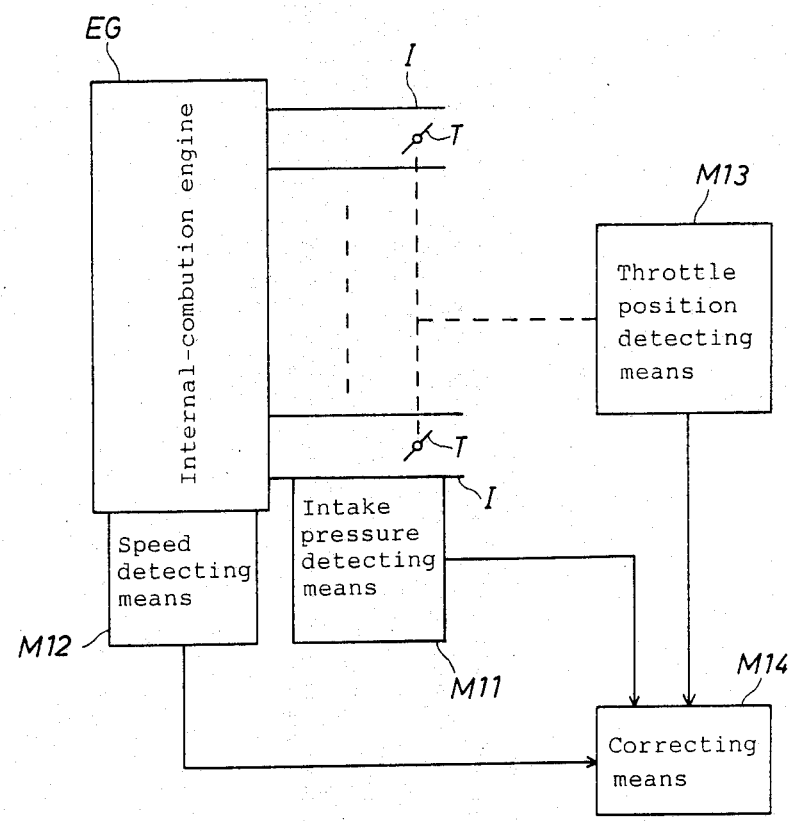

Arrangements of various means used in the first preferred embodiment are represented in two ways as shown in FIGS. 1(A) and 1(B). The arrangement of FIG. 1(B) is provided with means for detecting engine speed which is provided in addition to that of FIG. 1(A). As far as basic operations are concerned, however, there two arrangements have many things in common with each other and therefore descriptions of these will be given below collectively.

Figure 2:
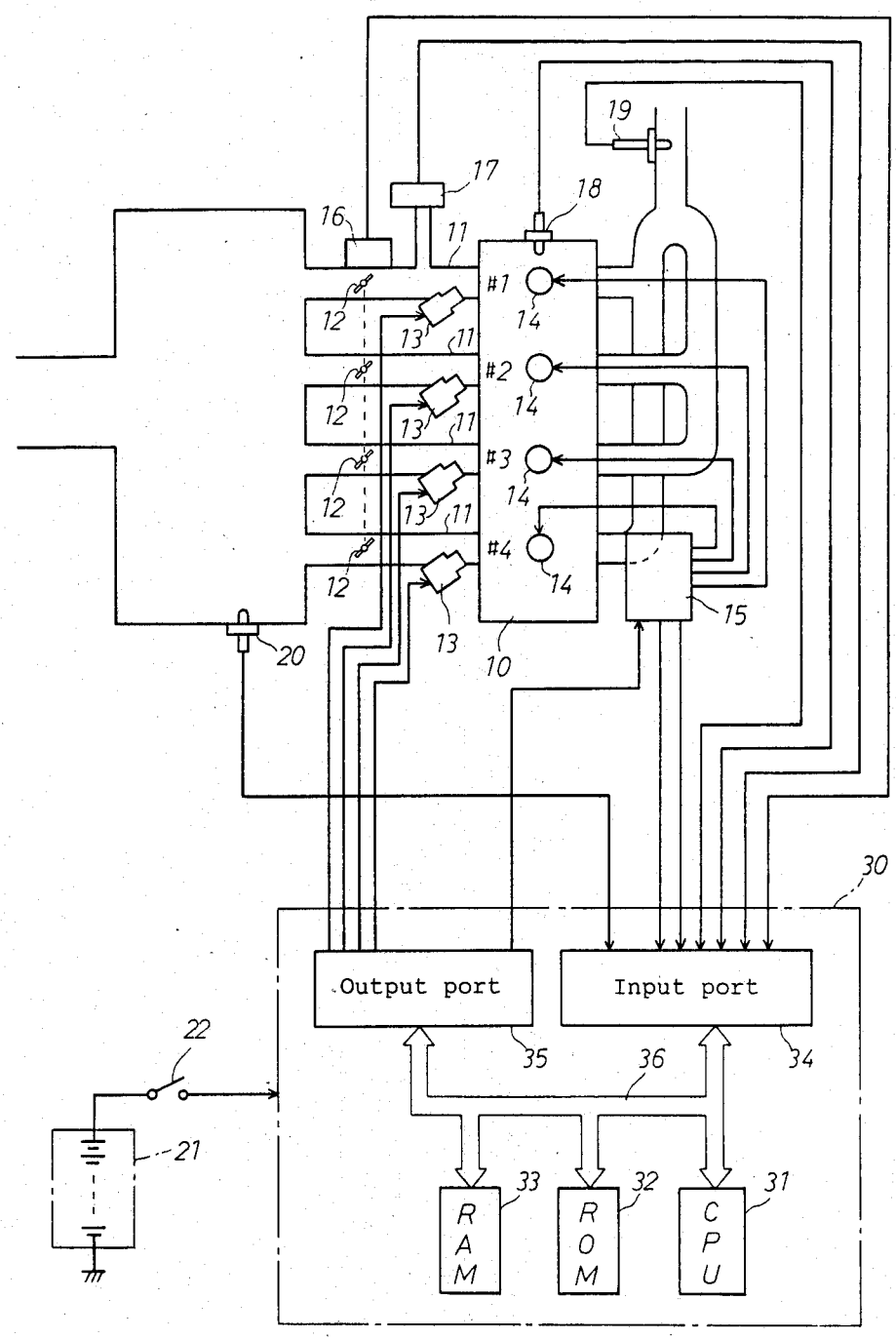
FIG. 2 is a block diagram showing schematic devices used in the first embodiment.

FIG. 2 is a schematic diagram showing a control system for a four-cylinder independent suction type internal combustion engine on which the suction pipe pressure detection apparatus of the embodiment is mounted.

Referring to FIG. 2, a four-cylinder engine 10 has a suction pipe 11 for each cylinder communicating with a throttle valve 12 interlocked with an accelerating pedal (not shown) and a fuel tank (not shown). The suction pipe 11 is provided with a fuel injection valve 13 for injecting fuel into the suction pipe. The cylinders are arranged in the order of the first cylinder, the second cylinder, the third cylinder, and the fourth cylinder from the top down in FIG. 2. An ignition plug 14 provided for each cylinder is properly supplied with a suitable high voltage from a distributor 15, whereby the ignition timing is determined. A throttle-opening sensor 16 detects the opening of the throttle valve 12 and outputs an analog output voltage proportional to the opening of the throttle valve 12. In the present embodiment, there is provided an intake pressure sensor 17 formed by a pressure sensor for detecting the suction pipe pressure on the downstream side of the throttle valve 12 in the suction pipe for the first cylinder. A water temperature sensor 18 detects the cooling water temperature for the internal combustion engine 10, an oxygen sensor 19 detects oxygen concentration in the exhaust gas from the engine 10, and an intake-air temperature sensor 20 detects the temperature of the intake air.

Outputs of these various sensors and operations of these various devices are centrally controlled by an electronic control 30. The electronic control 30 is shown in FIG. 2 as an arithmetic and logic circuit using a microcomputer and operates with power supplied from a car battery 21 through a key switch 22. The central processing unit (CPU) 31 of the microcomputer performs various arithmetic operations, and processes data according to control programs and tables (to be described later) stored in a read only memory (ROM) 32. A random access memory 33 (RAM) temporarily stores data. An input port 34 receives outputs from the above mentioned various sensors such as the throttle-opening sensor 16, intake pressure sensor 17, water temperature sensor 18, oxygen sensor 19, intake-air temperature sensor 20, a cylinder distinction signal from the distributor 15, and a rotational angle signal corresponding to a crank angle. The input port 34 includes an A/D converter, a waveform shaper, and so on, and properly supplies necessary digital data for the CPU 31. An output port 35, in response to operation results of the CPU 31, outputs timing and duration data for opening the valve to the fuel injection valve 13 for each cylinder, and supplies the distributor 15 with a signal for determining the ignition timing of the ignition plug 14. These component units of the electronic control 30 are interconnected by a data and address bus 36.

Figure 3A:
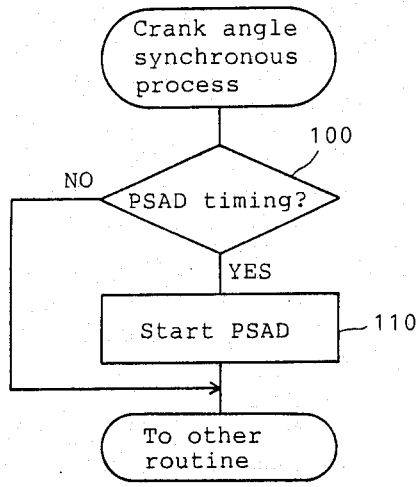
FIGS. 3(A) and 3(B) are parts of flow charts for the operations of the first embodiment.
Figure 3B:
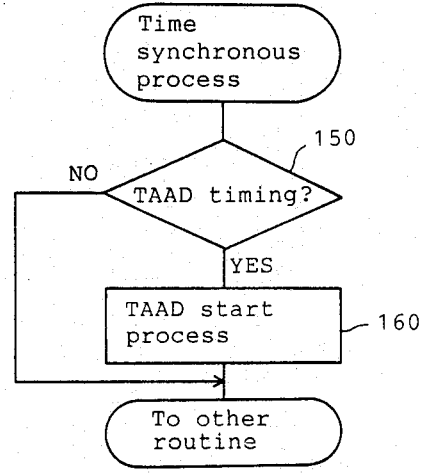
Figure 4:
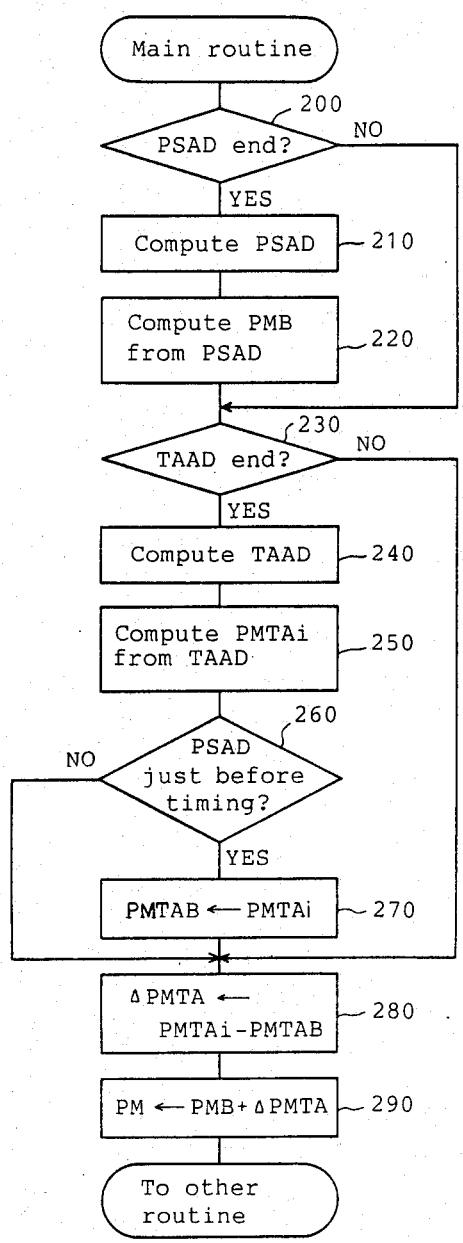
FIG. 4 is the entire flow chart.

FIGS. 3(A), 3(B) and FIG. 4 show flow charts for the suction pipe pressure detection programs stored in the ROM 32.

FIGS. 3(A) and 3(B) show flow charts of routines for determining the timing to receive outputs of the sensors. As shown in FIG. 3(A), a routine is repeatedly executed by the CPU 31 in synchronism with the crank angle of the internal combustion engine 10 for controlling the timing to detect the output of the intake pressure sensor 17. When a predetermined crank angle is reached and the CPU 31 enters into this routine, it is judged at the step 100 whether or not it is time to detect the suction pipe pressure PS. The timing to detect the PS means the time at which the intake pressure sensor 17 is generating an output to indicate the negative pressure condition at the suction stroke of the first cylinder as shown in the timing chart of FIG. 5(A). The X-axis or abscissa of FIG. 5(A) represents crank angles, in which the top dead center (TDC) of the first cylinder is taken as the reference point 0°. Therefore, the detecting of the output PS of the sensor is, as is apparent from the timing chart of FIG. 5(A), started at any point during the period when the curve drawn in a solid line showing the suction pipe pressure of the first cylinder is largely depressed (between around 0° CA and 360° CA). In the present embodiment, the detecting of PS is started at about 160° CA. If it is judged at the present step 100 of FIG. 3(A) that the crank angle is now about 160° CA, A/D conversion process of the output of the intake pressure sensor 17 is started in the next step 110, and a series of processes are started such that the input of the intake pressure sensor 17 is A/D converted in the input port 34 and its value PSAD (FIG. 5(B)) is temporarily stored in a buffer. If it is a time other than that when the crank angle is about 160° CA, the routine is ended without starting any of the above described processes in the step 110 and another routine is executed.

FIG. 3(B) shows a routine for detecting the output (TA) of the throttle-opening sensor 16 which is repeatedly executed by the CPU 31 at intervals of predetermined periods of time. When the processing by the CPU 31 is in this routine, it is judged at the step 150 whether or not a predetermined period of time (T [ms]; see FIG. 5(D)) has passed since this routine was executed the last time. Only in the case where the period T is judged to have passed since that last time, is the step 160 processed; otherwise, this routine is ended. The step 160 controls the start of a series of processes such that the output TA of the throttle-opening sensor 16 is A/D converted and this value (TAAD) is stored in a predetermined address, and thus the detecting of the TAAD is started. FIG. 5(D) is a timing chart showing the detecting of the output TA of the throttle-opening sensor 16. As shown in the chart, the detecting of the A/D converted value of the TA, TAAD, is repeated at intervals of predetermined periods T [ms]. The predetermined period T [ms] is always smaller than the above mentioned period of the detecting of the A/D converted value of the suction pipe pressure, PSAD, i.e., the detecting of the TAAD is carried out at higher frequency than the detecting of the PSAD. The detection timing of the TAAD is not necessarily in synchronism with such a short period T as discussed above it may alternatively be in synchronism with a crank revolution angle, e.g., at predetermined intervals defined by a crank angle smaller than the crank angle 720° CA of the PSAD detection timing.

FIG. 4 indicates the main routine of the present embodiment to compute the suction pipe pressure PM of the internal combustion engine 10. This routine is repeatedly executed by the CPU 31 at intervals of predetermined periods of time. When the CPU 31 enters into the processing in this routine, it is judged at the step 200 whether or not the A/D conversion of the output PS of the intake pressure sensor 17 (a series of processes started in the above described step 110) has been finished and whether the newest PS value has been detected. If, at this step, it is judged that the A/D conversion of the newest PS has not been finished, the routine advances to the step 230 (to be described later), and if A/D conversion is judged to have been finished the process in the next step 210 is started. In the step 210, the A/D converted value of the output PS of the intake pressure sensor 17, PSAD, is computed in the CPU 31. From the A/D converted value, PSAD, is computed (step 220) reference suction pipe pressure PMB (the true suction pipe pressure at the time when the output PS of the intake pressure sensor 17 was detected). That is, the PMB is computed at every 160° CA of the crank angles (FIG. 5(C)). The following steps 230 and 240 are for executing similar processes as executed in the steps 200 and 210, that is, it is judged whether or not the detection of the throttle opening TA at the step 160 in FIG. 3(B) has been finished and whether the newest TA value has been detected (step 230), and if it has not been finished, the step 230 (to be described later) is executed. If it has been finished, then computation of the A/D converted value of the TA, TAAD, is executed (step 240). From the value TAAD, through processing in the next step 250, is calculated a correction value of the reference suction pipe pressure PMB, PMTAi, and the same is stored in the RAM 33. Both the above mentioned PMB and the PMTAi in the present step may be obtained either through actual computation or, in order to speed up the operation, through retrieval from a table which has been stored in the ROM 32 in advance. In the computation of the PMTAi, the engine speed NE can also be taken into consideration in addition to the throttle opening TA, and the PMTAi may be calculated from the TA and NE. Since the suction pipe pressure varies with the engine speed if the throttle opening is kept the same, the PMTAi calculated from both values will give the correction value with higher accuracy. In the next step 260, it is judged whether or not the PMTAi calculated in the step 250 was at a time immediately before the A/D conversion of the PS is to be carried out. As shown in FIGS. 5(B) and (D), the PSAD is calculated at intervals of 720° and the TAAD is calculated at intervals of predetermined periods of T. The frequency of the calculation of the TAAD is always set higher than that of the PSAD. Therefore, a computation of the TAAD must have been carried out within the small time difference of a computing timing of the PSAD. For such a reason, it is judged in the present step whether or not the PMTAi was calculated from the TAAD calculated at a time immediately before the calculation time of the PSAD. If the PMTAi is immediately before the timing of the PSAD, then, the step 270 is executed and the value of the PMTAi is assigned to the variable PMTAB; otherwise, the routine advances to the step 280. The relationship between the PMTAi and PMTAB is shown in FIG. 5(D).

The steps 280 and 290 are for computing the suction pipe pressure PM. The value PM is calculated from the newest value of PMB and values PMTAB and PMTAi by the formula:

$$PM = PMB + (PMTAi - PMTAB).$$

that is the value of PMB is provided with correction by the value (PMTAi−PMTAB) which is calculated at the step 280. The PMTAB is the value that was calculated immediately before the PMB was calculated as described in the foregoing, and so, the influence of the throttle opening TA on the suction pipe pressure (PMTAB) should have already been included in the value of PMB. If, however, the opening of the throttle valve 12 is regulated in either the opening or closing direction after the PMB was calculated, the suction pipe pressure PM and the engine speed NE will naturally vary, but the variation in the PM cannot be calculated until another predetermined crank angle (160° CA) is reached. Therefore, to provide the information on the suction pipe pressure PM of the internal combustion engine 10 while the detection of the PM is impossible, the difference between the PMTAi, which has been calculated from the present throttle opening TA or from both the TA and the engine speed NE, and PMTAB is calculated. In other words, the variation in the suction pipe pressure due to change in the throttle opening TA, and change in the engine speed NE, is computed and this value is added to the PMB thereby always providing computation of the suction pipe pressure PM (FIG. 5(E)). The shaded portion in FIG. 5(D) indicates the correction width for the suction pipe pressure in accordance with the throttle opening TA, or with the throttle opening TA and the engine speed NE.

Although the above description of the embodiment has been made for the case where the intake pressure sensor 17 was provided only for the suction pipe of one cylinder of a four-cylinder independent suction type internal combustion engine, it is apparent that the embodiment can likewise be applicable to such cases where two intake air pressure sensors are provided for a six-cylinder internal combustion engine or four intake air pressure sensors are provided for an eight-cylinder internal combustion engine, or, in brief, applicable to internal combustion engines for which the intake air pressure sensors fewer than the cylinders are provided.

The thus calculated PM value can be widely used for various controlling purposes which are known, such as for calculating the fuel injection amount to keep the air-fuel ratio for the internal combustion engine 10 at a desired level, and for calculating the ignition timing for controlling the output torque and emission of the internal combustion engine 10.

Figure 6:
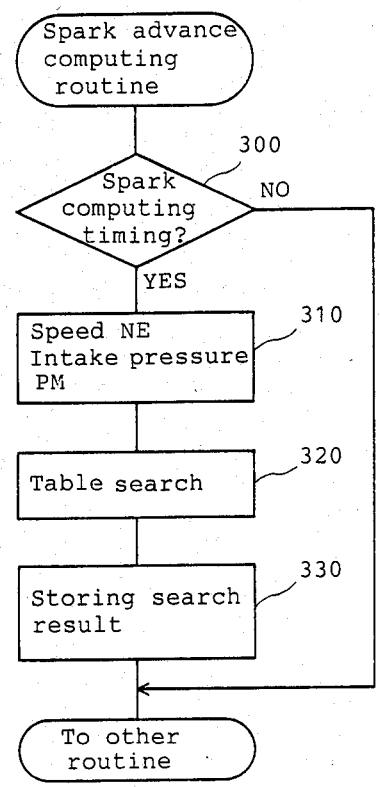
FIG. 6(A) is a flow chart showing an application example of the first embodiment.
FIG. 6(B) is a drawing showing an example of a map used in the application example of FIG. 6(A)
Figure 6:
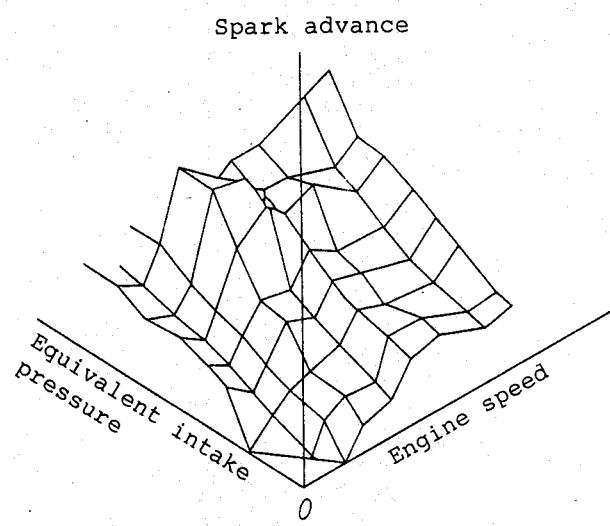

FIGS. 6(A) and 6(B) show an application example to determine the ignition timing for an internal combustion engine 10 with the use of the suction pipe pressure PM detected in the suction pipe pressure detection apparatus of the present embodiment. FIG. 6(A) is a flow chart for determining the ignition timing and FIG. 6(B) is an explanatory drawing of a table to be used in the flow chart.

The spark advance angle calculating routine in FIG. 6(A) is such that it is repeatedly executed as a part of the main routine or an independent routine for controlling internal combustion engine 10. In this routine, the spark advance angle, or the ignition timing, which contributes to the best operation of the internal combustion engine is calculated.

First, in the step 300, it is judged whether or not it is the right time to compute the spark advance angle, that is, whether any cylinder in the internal combustion engine 10 is about to need ignition or not is determined according to the crank angle data or the like. If it is determined that the spark advance angle should be computed now, the steps 310 to 330 are executed; otherwise, this routine is ended. In the step 310, the current engine speed NE of the internal combustion engine 10, and the suction pipe pressure PM are detected, that is, operating conditions of the internal combustion engine 10 necessary for computing the spark advance angle are detected. Here, the engine speed NE is always possible to detect from the rotary angle signal from the distributor 15, and the suction pipe pressure PM is available from the results of the computations in the above described embodiment. That is to say, prior to execution of the present routine, the routine of FIG. 4 is executed and the suction pipe pressure PM of the internal combustion engine 10 is already obtained. Then, in the step 320, the spark advance angle is given based on the above two values NE and PM and through retrieval from the table for computing the spark advance angle as shown in FIG. 6(B). In succession thereto, in the step 330, the result of the table retrieval is stored in the RAM 33 and the ignition is carried out in response to the data in the RAM through an ignition executing routine (not shown).

As described so far, the suction pipe pressure value PM provided through the computations in the above embodiment is not at all different from the suction pipe pressure value used as a parameter in the control of the internal combustion engines 10, and therefore the same can be widely used as a parameter for various existing control systems.

Figure 7:
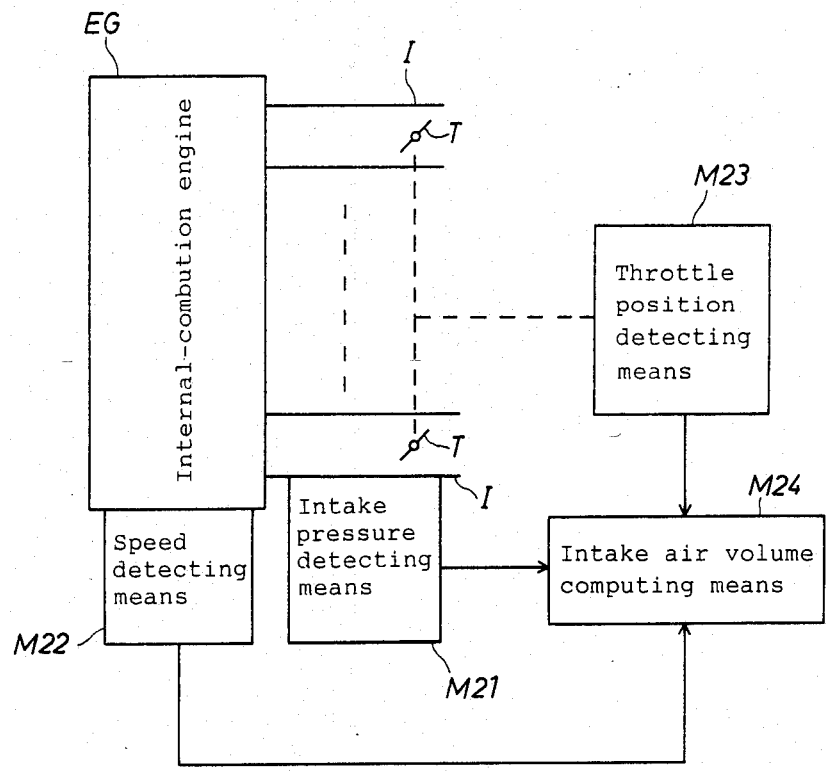
FIG. 7 is a basic block diagram of a second embodiment.

Next, the second preferred embodiment of the invention will be described. FIG. 7 is a drawing showing basic arrangement of various means in the present embodiment. Intake air quantity computing means in FIG. 7 includes correction means. Similar to the first embodiment, schematic arrangement of devices in the present embodiment is as shown in FIG. 2, and so, description thereof is omitted here. What is different from the first embodiment lies in the program in the ROM 32 in the computer 30; general remarks about the same will be given in the following with reference to flow charts of FIGS. 8(A), (B) and FIG. 9.

Figure 8A:
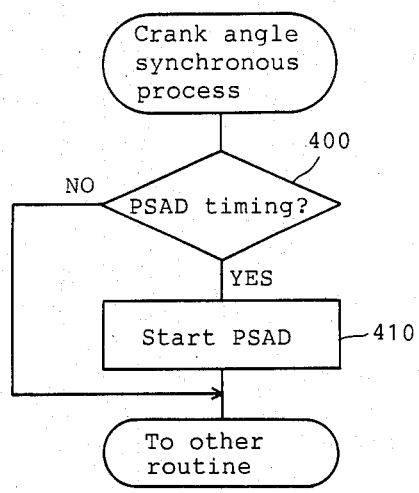
FIGS. 8(A) and (B) are partial flow charts for the second embodiment.

FIGS. 8(A) and (B) are flow charts for determining timing to detect outputs of sensors. FIG. 8(a) represents the routine repeatedly executed by CPU 31 in synchronism with the crank angle of the internal combustion engine 10 for controlling twice the timing for detecting of the output of the intake pressure sensor 17 for one cycle (two rotations of the crank shaft). When a predetermined crank angle is reached and the CPU 31 enters into the process in this routine, it is judged in the step 400 whether or not it is the time for detecting the intake air pressure PS. The time for detecting the PS means both the time when the intake pressure sensor 17 is generating the output to indicate the negative pressure condition at the suction stroke of the first cylinder and the time when the suction pipe pressure, after the suction stroke, has become equal to the atmospheric pressure as shown in the timing chart of FIG. 10(A) with the X-axis being crank angle, in which the TDC of the first cylinder is taken as the reference point 0°. Therefore, the detecting of the outputs PS is, as apparent from the timing chart of FIG. 10(A), started at any point during the period when the curve drawn in a solid line showing the suction pipe negative pressure of the first cylinder is largely depressed (between around 0° CA and 360° CA), and again when indicating constant value (between around 360° CA and 720° CA). In the present embodiment at about 160° CA and 680°. If it is judged at the step 400 that the crank angle is now about 160° CA or 680° CA, an A/D conversion process of intake pressure sensor 17 is started in the next step 410, and a series of processes are started such that the output of the intake pressure sensor 17 is A/D converted in the input port 34 and its value PSAD 1 (PS value at 160° CA), and PSAD 2 (PS value at 680° CA) (FIGS. 10(B), (C)) is temporarily stored in a buffer. If it is other time than that when the crank angle is about 160° CA or 680° CA, the routine is ended without starting any of the above described processes in the step 410 and another routine is executed.

Figure 8B:
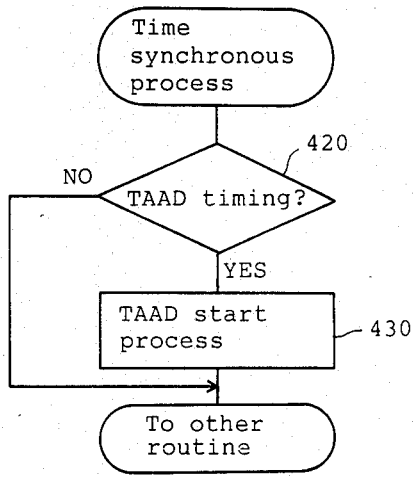

FIG. 8(B) shows a routine for taking up the output (TA) of the throttle-opening sensor 16 which is repeatedly executed by the CPU 31 at intervals of predetermined periods of time. When the processing by the CPU 31 is brought into this routine, it is judged at the step 420 whether or not a predetermined period of time T has passed since this routine was executed last time. Only in the case where the T is judged to have passed since that time, is the step 430 processed; otherwise, this routine is ended. The step 430 controls start of a series of processes such that the output TA of the throttle-opening sensor 16 is A/D converted and this value (TAAD) is stored in a predetermined address, and thus detecting of the TAAD is started. FIG. 10(E) is a timing chart showing the detecting of the output of the throttle opening sensor TA. As shown in the chart, the detecting of the A/D converted value of the TA, TAAD, is made at intervals of predetermined periods T. The predetermined period T is always shorter than the above mentioned period of detecting A/D converted value of the suction pipe negative pressure, PSAD, i.e., the detecting of the TAAD is carried out at higher frequency than the detecting the PSAD.

Figure 9:
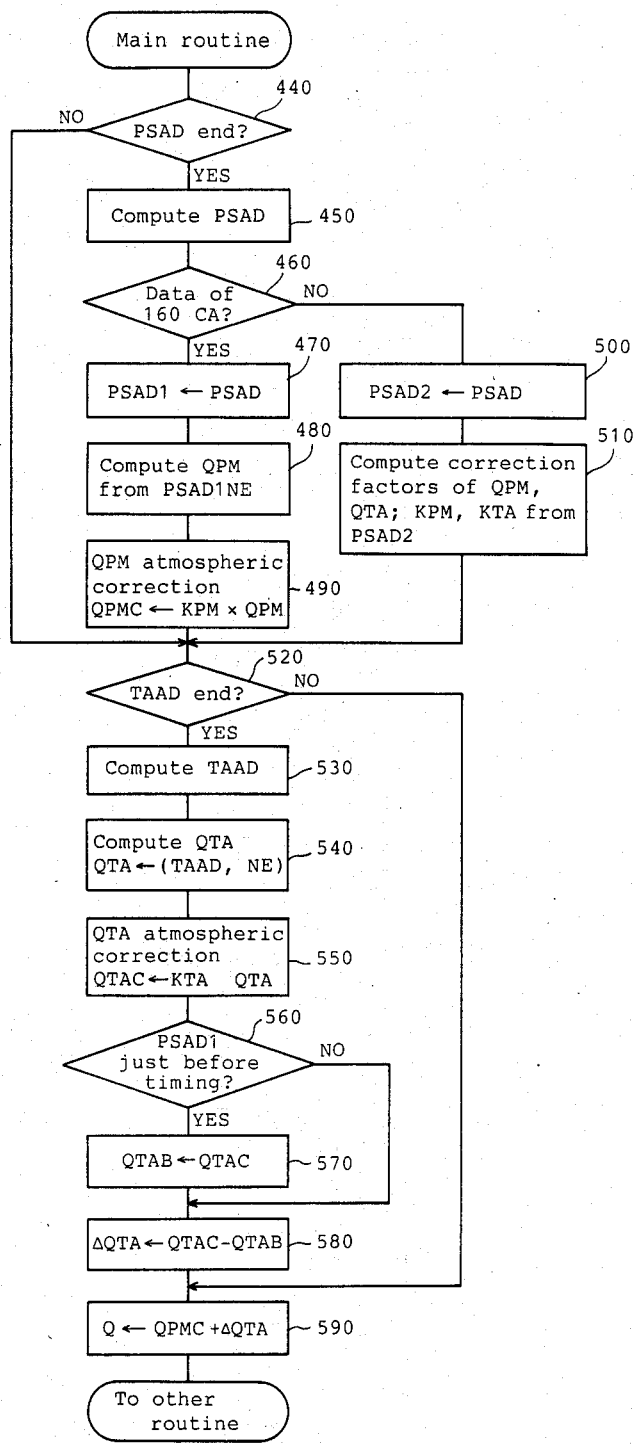
FIG. 9 is an overall flow chart for the second embodiment.

FIG. 9 indicates the main routine of the present embodiment which computes the intake air quantity Q for the internal combustion engine 10. This routine is repeatedly executed by the CPU 31 at intervals of predetermined periods of time. When the CPU 31 enters into the processing in this routine, it is judged at the step 440 whether or not the A/D conversion of the output PS of the intake pressure sensor 17 (a series of processes started in the above described step 410) has been finished and the newest PS value has been detected. If, at this step, it is judged that the A/D conversion of the newest PS has not been finished, the routine advances to the step 520 (to be described later), and if the A/D conversion is judged to have been finished the process in the next step 450 is executed. In the step 450, the A/D converted value of the output PS of the intake pressure sensor 17, PSAD, is computed in the CPU 31. And it is judged whether the A/D converted value, PSAD, was detected in synchronism with the crank angle 160° CA, or detected in synchronism with the crank angle 680° CA (step 460). If it is the data at 160° CA, a reference intake air quantity QPMC is computed through the process in the steps 470 to 490, and if it is the data at 680° CA, atmospheric pressure compensation factors KPM, KTA for QPM, QTA (to be described later) are computed through processes in the steps 500 and 510. Computation of the QPMC will first be described. The value of the PSAD computed in the step 450 is assigned to the variable PSAD1 as a value indicating the negative pressure condition of the intake air (step 470), and the intake air quantity QPM is computed from multiplying value PSAD1 and the engine speed NE of the internal combustion engine 10 (step 480). This computation is not at all different from the above-described computation of the intake air quantity Q and the quantity is provided either through computation in the CPU31 or retrieval from a table stored in the ROM 32 in advance. The thus obtained intake air quantity QPM is multiplied by the atmospheric pressure compensation factor KPM in the following step 490 and a reference intake air quantity QPMC is thereby provided. On the other hand, the atmospheric pressure compensation factor KPM used in the above computation of the reference intake air quantity QPMC and the atmospheric pressure compensation factor KTA for intake air quantity correction value QTA (described later) to be calculated based on the throttle opening TA are computed in the steps 500 and 510. First, in the step 500, the value of PSAD computed in the step 450 is assigned to the variable PSAD 2, and in the next step 510, the two atmospheric pressure compensation factors KPM and KTA are computed. These two atmospheric pressure compensation factors KPM and KTA are a function of PSAD 2 and are provided either through computation in the CPU 31 or retrieval on respectively prepared tables stored in the ROM 32. When the atmospheric pressure varies, the intake air quantity also varies even under the same suction pipe pressure or the throttle valve. By formulating the variations in advance so as to be computed by the CPU 31 or representing the same in the table so as to be retrieved, it is possible to compensate for the variations.

When the QPMC or the KPM and KTA have thus been computed, the next step 520 is executed. In the step 520, similar processes as executed in the step 440 are executed, that is, it is judged whether or not the detecting of the throttle opening TA at the step 430 in FIG. 8(B) has been finished and the newest TA value has been detected, and if it has not been finished, the step 590 (to be described later) is executed, and if it has been finished, then a series of processes in the steps 530 to 580 are executed. The processes in the steps 530 to 580 are for computation of the value (ΔQTA) to be added to or subtracted from the above described reference intake air quantity QPMC computed in the step 490. First, in the step 530, the A/D converted value, TAAD, of the throttle opening TA is calculated and supplied to the CPU 31 to be processed by the same. From the value TAAD and the engine speed NE of the internal combustion engine 10, the intake air quantity QTA to be calculated from the throttle opening TA is computed (step 540). This computation of QTA, similar to the above described QPM, is carried out either through direct computation or through retrieval from a table. In the next step 550, the above QTA is multiplied by the compensation factor KTA obtained from the newest detected result of atmospheric pressure (PSAD 2) computed in the step 500, and thus, the intake air quantity correction value QTAC obtained from the throttle opening TA provided with atmospheric pressure compensation is computed. In the next step 560, it is judged whether or not the TAAD calculated in the step 530 was of the timing immediately before the A/D conversion of the PSAD 1 was carried out. As shown in FIGS. 10(B) and (E), the PSAD 1 is calculated at intervals of 720° CA of crank angles and the TAAD is calculated at intervals of predetermined periods of T, and the frequency of the calculation of the TAAD is always set higher than that of the PSAD. Therefore, a computation of the TAAD must have been carried out within a small time difference of the computing timing of the PSAD 1. For such reason, it is judged in the present step whether or not the QTAC was calculated from the TAAD calculated at the timing immediately before the calculation timing of the PSAD 1. If the QTAC was of the timing immediately before the timing of the PSAD 1, then, the step 570 is executed and the value of the QTAC is assigned to the variable QTAB; otherwise, the routine advances to the step 580. Relationship between the QTAC and QTAB is shown in FIG. 10(E).

The step 580 is the step for computing ΔQTA, the value to be added to or subtracted from the intake air quantity. The ΔQTA is calculated from the newest value of the QTAC and the value of the QTAB by the following formula:

$$\Delta QTA = QTAC - QTAB$$

The QTAB is the value that was calculated immediately before the QPMC was calculated as described in the foregoing, and so, the influence of the throttle opening TA on the intake air quantity (QTAB) should have already been included in the value of QPMC. If, however, the opening of the throttle valve 12 is regulated in either the opening or closing direction after the QPMC was calculated, the intake air quantity and the engine speed NE will naturally vary, but the variation in the intake air quantity cannot be computed until another crank angle (160° CA) is reached. Therefore, to provide for computation of the intake air quantity for the internal combustion engine 10 while the detection of the intake air quantity is impossible, the difference between the QTAC, which has been calculated from the present throttle opening TA and the engine speed NE, and the QTAB is computed. In other words, the variation in the intake air quantity due to changes in the throttle opening TA and the engine speed NE, is computed. This value (ΔQTA) is added to the QPMC (step 590) to thereby always provide by calculation the intake air quantity Q (FIG. 10(F)) for the internal combustion engine 10. The shaded portion in FIG. 10(E) indicates the correction width of the intake air quantity (ΔQTY) in accordance with the throttle opening TA and the engine speed NE. The thus calculated intake air quantity Q can be widely used for various controlling purposes which have been in practice, such as for calculating the fuel injection amount to keep the air-fuel ratio for the internal combustion engine 10 at a desired level, and for calculating the ignition timing for controlling the output torque and emission of the internal combustion engine 10.

Figure 11:
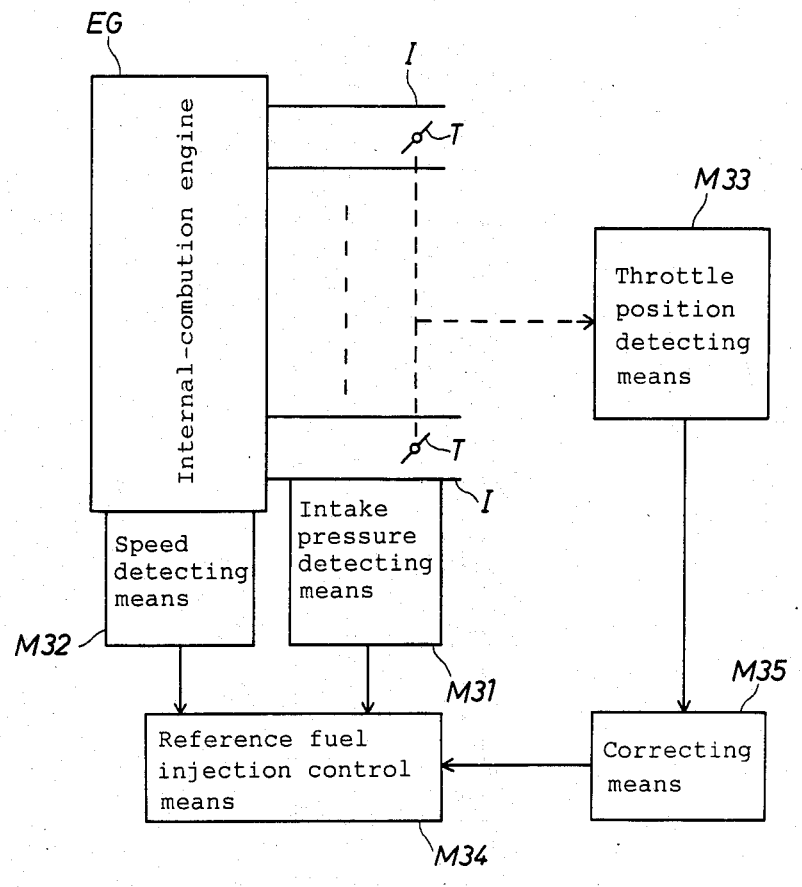
FIG. 11 is a basic block diagram common for third and fourth embodiments.
Figure 12:
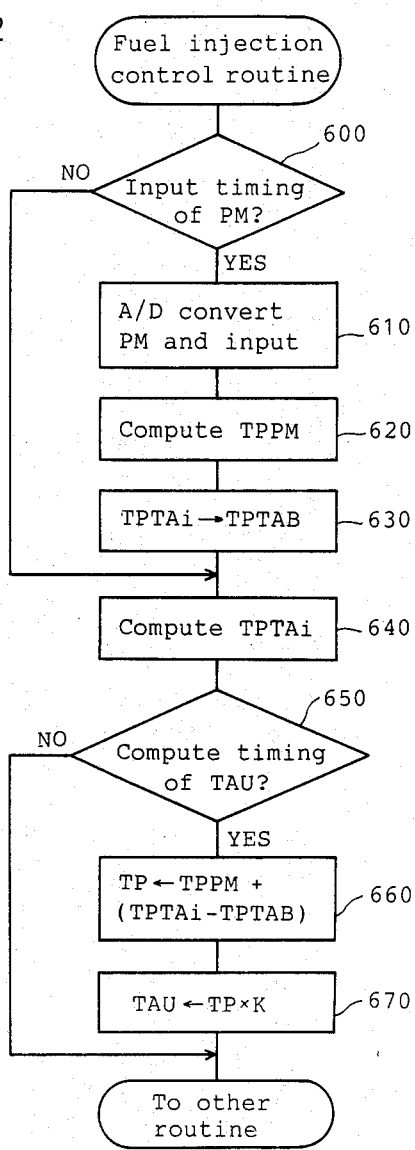
Figure 14:
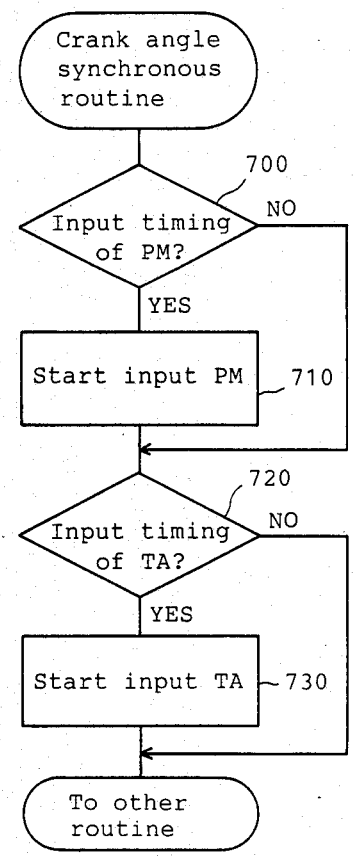

The third and fourth embodiments are the same as the first embodiment in schematic arrangement of various devices as shown in FIG. 2. And the third and fourth embodiments are the same in basic arrangement of various means as shown in FIG. 11, but they are different in the program stored in their respective ROMs 32. The flow chart for the third embodiment is shown in FIG. 12 and that for the fourth embodiment is shown in FIGS. 14(A), (B). First, the third embodiment will be described with reference to the flow chart of FIG. 12.

The routine of FIG. 12 is that which is repeatedly executed by the CPU 31 at intervals of predetermined periods of time. When the CPU 31 enters into this routine, first, it is judged in the step 600 whether or not it is right time, i.e., a predetermined crank angle is reached, for detecting the negative suction pipe pressure PM. While the suction pipe pressures PM for various cylinders vary as the crank angles change as shown in the timing chart of FIG. 13(A) (which is shown with the TDC of the first cylinder taken as the reference point 0°) and the negative pressure of the first cylinder suction pipe varies as shown in a solid line, the above judgment is made for synchronizing the detection of the output of the intake pressure sensor 17, which is followed by A/D conversion and storage of the data in a predetermined address, with the crank angle reaching the point where the negative pressure of the first cylinder suction pipe is substantially at the lowest level (when the crank angle is about 180° CA). In the present step, if it is not the right time in terms of the crank angle for detecting the value PM, i.e., if the crank angle is not at 180° CA, the routine advances to the step 640 (described later), but if it is the predetermined right angle, the next step 610 is executed. In the step 610, the output of the intake pressure sensor 17 is detected and A/D converted. Then, based upon the A/D converted value PM and the engine speed NE at that time, a reference fuel injection amount (a period of time during which the fuel injection valve 13 is open) TPPM is computed (step 620). That is, the TPPM is computed at every 180° of the crank angle (FIG. 13(B)). In the following step 630, the newest value of a TPTAi (described later) is assigned to a variable TPTAB. The step 640 is a step that is executed without fail every time the present routine is processed, in which the output TA of the throttle-opening sensor 16 is detected and the correction value TPTAi for the fuel injection amount TP is computed from the value TA and the present engine speed NE of the internal combustion engine 10 and the result is stored in the RAM 33. Therefore, the TPTAi mentioned in the description of the preceding step 630 was that which had already been computed at the step 640 and stored in the RAM 33 when the present routine had been executed immediately before that step 630 was executed, and this value of the TPTAi, in fact, was assigned to the variable TPTAB in the step 630. These situations are represented in FIG. 13(C). In the drawing, the period of time T for detecting output TA is the period at intervals of which the routine of FIG. 12 is repeated. The timing for computation of the TPPM (in synchronism with the crank angle) executed in the step 620 is independent from the above T, and the value obtained immediately before that timing becomes the TPTAB, and thereafter the TPTAi is computed at intervals of the periods T. The computation of both the value TPPM in the earlier step and the value TPTAi in the present step can be made either through actual arithmetic operation or through retrieval from a table which has been stored in the ROM 32 in advance.

In the following step 650, it is judged whether it is right time or not to compute the fuel injection period TAU during which the fuel injection is carried out. The results of the computation of the TAU and the injection timing are shown in FIG. 13(D) and the fuel injection is carried out during the predetermined stroke of each cylinder. Therefore, until that time comes, the CPU 31 ends the processing of the present routine without computing the TAU to execute various other processes. If it is judged in the present step that it is the right time for computing the TAU, then the following step 660 is executed. The step 660 is a step for computing a fuel injection time TP, which is obtained from the newest TPPM value and the values of TPTAB and TPTAi by the following formula:

$$TP = TPPM + (TPTAi - TPTAB),$$

that is, by providing the value of the TPPM with a correction value (TPTAi − TPTAB).

The TPTAB is the value that was computed immediately before the TPPM was computed as described in the foregoing, and so, the influence of the throttle opening TA on the fuel injection period (TPTAB) should have already been included in the value of TPPM. If, however, the opening of the throttle valve 12 is regulated in either the opening or closing direction after the TPPM was calculated, the suction pipe pressure PM will naturally vary, but the variation in the suction pipe pressure PM cannot be computed until the next predetermined crank angle is reached. Therefore, in order to provide information on the fuel injection period TAU while the detection of the PM is impossible, the difference between the TPTAi, which has been calculated from the present throttle opening TA, and TPTAB is calculated. In other words, the change in the fuel injection period due to change in the throttle opening TA as compared with the value at the time of the computation of the TPPM was made, is computed. And this value is added to the TPPM and thereby the fuel injection period TAU required by the internal combustion engine 10 is computed. The computed TP is then provided with known compensation, for example, the same is multiplied by a compensation factor K including feedback compensation according to the output of the oxygen sensor 19 and extending compensation at the time of low temperature according to the output of the water temperature sensor 18. Thus the fuel injection period TAU for applying to the fuel injection valve 13 is computed and stored in a predetermined address in the RAM 33 (the step 670). Then the present routine is ended. Thereafter, suitable fuel injection is made into each cylinder in accordance with the value TAU stored in the predetermined address by a fuel injection executing routine (not shown), which is executed in synchronism with a predetermined crank angle. That is, the fuel injection valves 13 are opened at the timing shown in FIG. 13(D) for the periods TAU. The superscript given to each TAU in FIG. 13(D) represents the cylinder number for which the fuel injection valve 13 is opened for the period TAU. In FIG. 13(D), as apparent from the above description, the value of the first TAU having superscript 4 (the third one from the left side of the drawing) compared to that of the second TAU having superscript 4 (the second one from the right side of the drawing) are computed based on the value of the TPPM which is shown to the left on FIG. 13(B), and therefore, the TAU of the fourth cylinder is computed based upon the value TPPM uncompensated (TP=TPPM). The TAU of the next cylinder No. 2 is computed based upon the value TPPM compensated by (TPTA1−TPTAB), in which TPTA1 is influenced by the throttle opening TA a moment before, and in this way, the final fuel injection periods TAU are computed.

Now, the fourth embodiment will be described with flow charts in FIGS. 14(A) and (B).

The flow chart of FIG. 14(A) is that which is repeatedly executed by the CPU 31 in synchronism with the crank angle of the internal combustion engine 10 and controls the timing for detecting the outputs of the intake pressure sensor 17 and the throttle-opening sensor 16. When the CPU 31 first enters into the processing of the present routine at a predetermined crank angle, it is judged in the step 700 whether or not it is the time to detect the suction pipe pressure PM. The time to detect the PM means that time when the intake pressure sensor 17 is generating the output to indicate the pressure condition at the suction stroke of the first cylinder as shown in the timing chart of FIG. 15(A) with the X-axis representing crank angles, in which the top dead center (TDC) of the first cylinder is taken as the reference point 0°. Therefore, the detecting of the output PM is, as apparent from the timing chart of FIG. 15(A), started at any point during the period when the curve drawn in a solid line showing the PM of the first cylinder is largely depressed (between around 0° CA and 360° CA). In the present embodiment, at about 160° CA. If it is judged at the present step 700 that the crank angle is about 160° CA, and A/D conversion process of the output of the intake pressure sensor 17 is started in the next step 710, and a series of processes are started such that the output of the intake pressure sensor 17 is A/D converted in the input port 34 and its value PMAD (FIG. 15(B)) is temporarily stored in a buffer. If it is a time other than that when the crank angle is about 160° CA, none of the above described processes in the step 710 is started and the next step 720 is executed. The step 720 is for judgment whether or not it is the time for detecting the output TA of the throttle-opening sensor 16. The timing is similar to the above time for detecting the PM, in synchronism with the crank angle, and the sampling is carried out, as shown in FIG. 15(D), at shorter intervals of periods than that for detecting of the PM. In the present embodiment, an example where four sampling times are carried out at equal intervals between 0° CA to 720° CA is shown, and in FIG. 15(D), the dotted line indicates the analog output TA of the throttle-opening sensor 16 and the solid line indicates its A/D converted value TAAD. In the drawing is shown the throttle opening TA varying during the period from the first detecting the PMAD to the second detecting. If it is judged to be the time for detecting the TA in the step 720, then the next step 730 is followed and there an A/D conversion of the TA is started. Otherwise, the present routine is ended and another routine is executed.

Figure 14B:
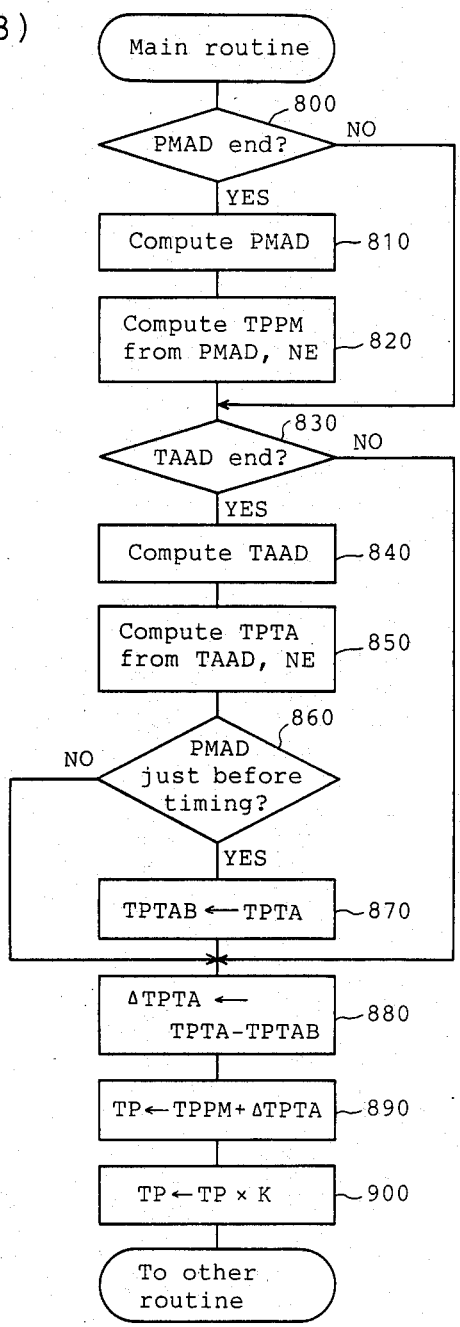

FIG. 14(B) indicates the main routine of the present embodiment which determines the fuel amount to be supplied by injection to the internal combustion engine 10. This routine is repeatedly executed by the CPU 31 at intervals of predetermined periods. When the CPU 31 enters into the processing in this routine, it is judged in the step 800 whether or not the A/D conversion of the suction pipe pressure PM (a series of processing started in the above described step 710) has been finished and the newest PM value has been detected. If, at this step, it is judged that the A/D conversion of the newest PM has not been finished, the routine advances to the step 830 (to be described later), and if the A/D conversion is judged to have been finished the process in the next step 810 is executed. In the step 810, the A/D converted value of the output PM of the intake pressure sensor 17, PMAD, is computed in the CPU 31. And based on these two values, i.e., the A/D converted value, PMAD, and the engine speed NE of the internal combustion engine 10 at that time, a reference fuel injection amount TPPM (the period during which the fuel injection valve 13 is opened) is computed in step 820. That is, the TPPM is computed at every 160° CA of the crank angle (FIG. 15(C)). The next steps 830 and 840 are for executing similar processes as executed in the steps 800 and 810, that is, it is judged whether or not the detecting of the throttle opening TA at the step 730 in FIG. 14(A) has been finished and the newest throttle opening value TA has been detected (step 830). If it has not been finished, the step 880 (to be described later) is executed. And, if it has already been finished, then computation of the A/D converted value of the TA, TAAD (FIG. 15(D)) is executed in the CPU 31 (step 840). Then, based on the TAAD and the present engine speed NE of the internal combustion engine 10, a correction value for the reference fuel injection amount TP, TPTA, is computed through the processing in the next step 850, and the same is stored in the RAM 33. These situations are represented in FIGS. 15(D) and (E). The above mentioned TPPM and the TPTA in the present step may be obtained either through actual computation or, in order to speed up the operation, through retrieval from a table which has been stored in the ROM 32 in advance. In the next step 860, it is judged whether or not the TPTA computed in the step 850 is of the timing immediately before the A/D conversion of the PM was carried out. As shown in FIGS. 15(B) and (D), the PMAD is computed for each 720° CA and the TAAD is computed for each 180° CA, and so, it is judged whether or not the above TPTA has been computed based on the TAAD computed immediately before the PMAD is computed, or, in the present embodiment, based on the TAAD processed in synchronism with about 150° CA of the crank angle. If the TPTA is of the timing immediately before the computation of the PMAD, then the step 870 is executed and the value of the TPTA is assigned to the variable TPTAB. Otherwise, the routine advances to the step 880. The relationship between the TPTA and TPTAB is indicated in FIG. 15(E), in which the solid line indicates the TPTA and the dotted line indicates the TPTAB. The value assigned to the TPTAB is not necessarily from the time immediately before the computation of the PMAD. It is enough if a TPTA value substantially coincident with the PMAD is assigned to the TPTAB. That TPTA occurring immediately after the computation of the PMAD, for example, may be applicable.

The steps 880 and 890 are for computing the fuel injection period TP. The value TP is calculated from the newest value of TPPM and values TPTAB and TPTA by the formula:

$$TP = TPPM + (TPTA - TPTAB).$$

That is, the value of TPPM is provided with correction by the value (TPTA−TATAB) which is calculated at the step 880. The TPTAB is the value that was calculated immediately before the TPPM was calculated as described in the foregoing, and so, the influence of the throttle opening TA on the fuel injection period (TPTAB) should have already been included in the value of TPPM. If, however, the opening of the throttle valve 12 is regulated in either the opening or closing direction after the TPPM as calculated, the suction pipe pressure PM will naturally vary, but the variation in the PM cannot be calculated until another crank angle (160° CA) is reached. Therefore, to provide the necessary information on the fuel injection period TP while the detection of the PM is impossible, the difference between the TPTA, which has been calculated from the present throttle opening TA, and the TPTAB is computed. In other words, the change in the fuel injection period due to change in the throttle opening TA as compared with the value at the time when the computation of the TPPM was made is computed. This value is added to the TPPM and thereby the fuel injection period TP (FIG. 15(F)) required by the internal combustion engine 10 is computed. The shaded portion in FIG. 15(E) represents the correction width for the fuel injection period due to the change in the throttle opening TA. The thus computed TP is then provided in the step 900 with compensation which is known, namely, the same is multiplied by a compensation factor K such as feedback compensation according to the output of the oxygen sensor 19 for extending compensation at the time of low temperature according to the output of the water temperature sensor 18. Thus the fuel injection period TP for applying to the fuel injection valve 13 is computed and the present routine is ended. Thereafter, suitable fuel injection is made into each cylinder in accordance with the value TP stored in a predetermined address by a fuel injection executing routine (not shown), which is executed in synchronism with a predetermined crank angle. That is, the fuel injection valves 13 are opened at the timing shown in FIG. 15(F) for the period TP.

The superscript given to each TP in FIG. 15(F) represents the cylinder number for which the fuel injection valve 13 is opened for the period TP. In FIG. 15(F), as apparent from the above description, the values of the TPs from that whose superscript is 3 (the second one from the left side of the drawing) to that whose superscript is 3 (the third one from the right side of the drawing) are computed based on the value of the TPPM which is shown to the left on FIG. 15(C). The TP of the next cylinder No. 2 is computed with the value TPPM uncompensated (TP=TPPM), and the TP of the next cylinder No. 1 is computed with the value TPPM compensated by (TPTA1−TPTAB), in which TPTA1 is influenced by the throttle opening TA a moment before. In this way, the final fuel injection periods TP are computed.

As described in detail in the foregoing, the electronic fuel injection control of each of the third and fourth embodiments detects the suction pipe pressure PM in synchronism with the predetermined crank angle with the use of the single intake pressure sensor 17 provided in the suction pipe 11 of only one cylinder of the independent cylinder type internal combustion engine 10 on the downstream side of its throttle valve 12 shown in FIG. 2. Hence, an apparatus simple in structure and free from design restriction is provided. In spite of its simple structure, the apparatus constantly detects the opening of the throttle valve at intervals of predetermined periods of time, and thereby, if there are some periods during which detection of the suction pipe pressure PM is impossible, provides the required fuel injection periods corrected with great accuracy by the suction pipe pressure value PM computed based on the changes in the opening of the throttle valve 12, which the apparatus is adapted to continually detect at intervals of predetermined periods T. Thus, the internal combustion engine 10 is provided with an optimum amount of fuel supply for each cylinder and thereby enabled to fully exhibit good response that is characteristic of the independent cylinder type internal combustion engine. Further, the detection of the opening TA of the throttle valve 12 is carried out at intervals of predetermined periods of time, and the apparatus can compute the fuel injection amount with constant accuracy even if the internal combustion engine 10 greatly varies in speeds from low number to high number of revolutions. This is an advantageous feature specifically for the internal combustion engine system which is mounted on a vehicle which has a wide variety of engine speeds.

What is claimed is:

1. A suction pipe pressure detection apparatus for detecting the suction pipe pressure of an internal combustion engine having a throttle valve provided in the suction pipe for each cylinder thereof comprising:
   suction pipe pressure detection means for detecting the suction pipe pressure on the downstream side of the throttle valves provided for at least one cylinder out of the total number of cylinders of the internal combustion engine in synchronism with the crank angle of the internal combustion engine, and for generating a suction pipe pressure signal;
   throttle opening detection means for detecting the throttle valve opening at a higher frequency than that at which said suction pipe pressure detection means detects the suction pipe pressure, and for generating a throttle-opening signal; and
   correction means for correcting the suction pipe pressure signal according to the throttle-opening signal.

2. A suction pipe pressure detection apparatus according to claim 1, wherein said apparatus further comprises engine speed detection means for detecting the engine speed of the internal combustion engine, and for generating an engine speed signal, and wherein said correction means corrects the suction pipe pressure signal according to the throttle-opening signal and the engine speed signal.

3. A suction pipe pressure detection apparatus according to claim 1, wherein said apparatus further comprises engine speed detection means for detecting the engine speed of the internal combustion engine, and for generating an engine speed signal, and intake air quantity computing means responsive to the suction pipe pressure signal and the engine speed signal for generating an intake air quantity signal, and wherein said correction means corrects the intake air quantity signal according to the throttle opening signal.

4. A suction pipe pressure detection apparatus according to claim 3, wherein:

said intake air quantity computing means generates a reference intake air quantity signal as a function of the suction pipe pressure signal at a time when the suction pipe is at a predetermined suction stage, and as a function of the engine speed signal, and generates an intake air quantity correction value signal as a function of the throttle opening signal and the engine speed signal, wherein said correction means compensates the reference intake air quantity signal and the intake air quantity correction value signal according to the suction pipe pressure at a time when the suction pipe is not at the suction stage, and wherein said air intake quantity computing means generates an intake air quantity signal for the internal combustion engine as a function of a compensated reference intake air quantity signal and a compensated intake air quantity correction value signal.

5. A suction pipe pressure detection apparatus according to claim 2, wherein said apparatus further comprises reference fuel injection amount computing means, responsive to the suction pipe pressure signal and an engine speed signal, for generating a reference fuel injection amount signal, and wherein said correction means corrects the reference fuel injection amount signal according to the throttle-opening signal.

6. A suction pipe pressure detection apparatus according to claim 5, wherein said suction pipe pressure detection means detects the suction pipe pressure of one suction pipe out of the total suction pipes, and wherein said throttle opening detection means detects the throttle opening at intervals of predetermined periods.

7. A suction pipe pressure detection apparatus according to claim 1, wherein the correction means:

stores a reference throttle-opening signal outputted just after a suction pipe pressure signal is outputted;

calculates a difference between each of subsequent throttle-opening signals and the reference throttle-opening signal until a next suction pipe pressure signal is outputted; and corrects the suction pipe pressure signal according to the difference for obtaining a current suction pipe pressure.

* * * * *